US007159110B2

(12) United States Patent
Douceur et al.

(10) Patent No.: US 7,159,110 B2
(45) Date of Patent: ***Jan. 2, 2007

(54) IDENTIFYING AND COALESCING IDENTICAL OBJECTS ENCRYPTED WITH DIFFERENT KEYS

(75) Inventors: John R. Douceur, Bellevue, WA (US); William J. Bolosky, Issaquah, WA (US); Marvin M. Theimer, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/149,637

(22) Filed: Jun. 10, 2005

(65) Prior Publication Data

US 2005/0229012 A1 Oct. 13, 2005

Related U.S. Application Data

(63) Continuation of application No. 09/565,821, filed on May 5, 2000, now Pat. No. 6,983,365.

(51) Int. Cl.
*H04L 9/00* (2006.01)

(52) U.S. Cl. .................................... 713/165

(58) Field of Classification Search ..................... None
See application file for complete search history.

(56) References Cited

U.S. PATENT DOCUMENTS

| 5,008,936 | A | * | 4/1991 | Hamilton et al. | ........... 380/281 |
| 5,073,935 | A | | 12/1991 | Pastor | |
| 5,778,395 | A | | 7/1998 | Whiting et al. | |
| 5,940,507 | A | | 8/1999 | Cane et al. | |
| 6,049,874 | A | * | 4/2000 | McClain et al. | ........... 713/176 |
| 6,366,988 | B1 | * | 4/2002 | Skiba et al. | ............... 711/165 |
| 6,405,315 | B1 | | 6/2002 | Burns et al. | |
| 6,574,657 | B1 | | 6/2003 | Dickinson | |

* cited by examiner

*Primary Examiner*—Nasser Moazzami
*Assistant Examiner*—Brandon Hoffman
(74) *Attorney, Agent, or Firm*—Lee & Hayes, PLLC

(57) ABSTRACT

Cryptographic protocols and methods of employing the same are described. The described protocols advantageously enable two or more identical encryptable objects that are coded for encryption with different keys to be identified as identical without access to either the unencrypted objects or the keys that are used in the encryption process. Additionally, the protocols enable two or more identical encryptable objects to be processed with different encryption keys, yet be stored in a manner so that the total required storage space is proportional to the space that is required to store a single encryptable object, plus a constant amount for each distinct encryption key. In various embodiments, the encryptable objects comprise files and the cryptographic protocols enable encrypted files to be used in connection with single instance store (SIS) systems.

17 Claims, 10 Drawing Sheets

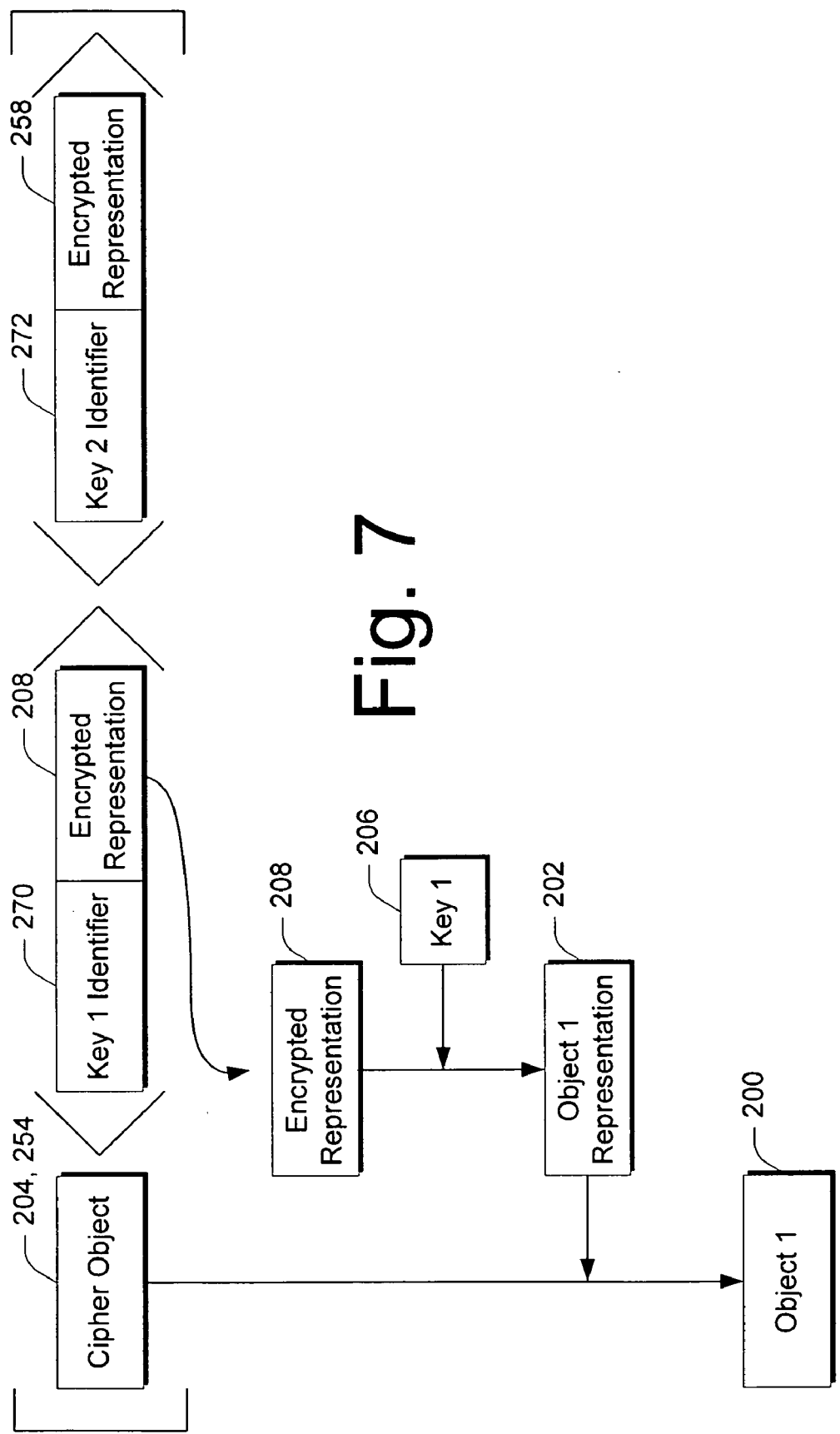

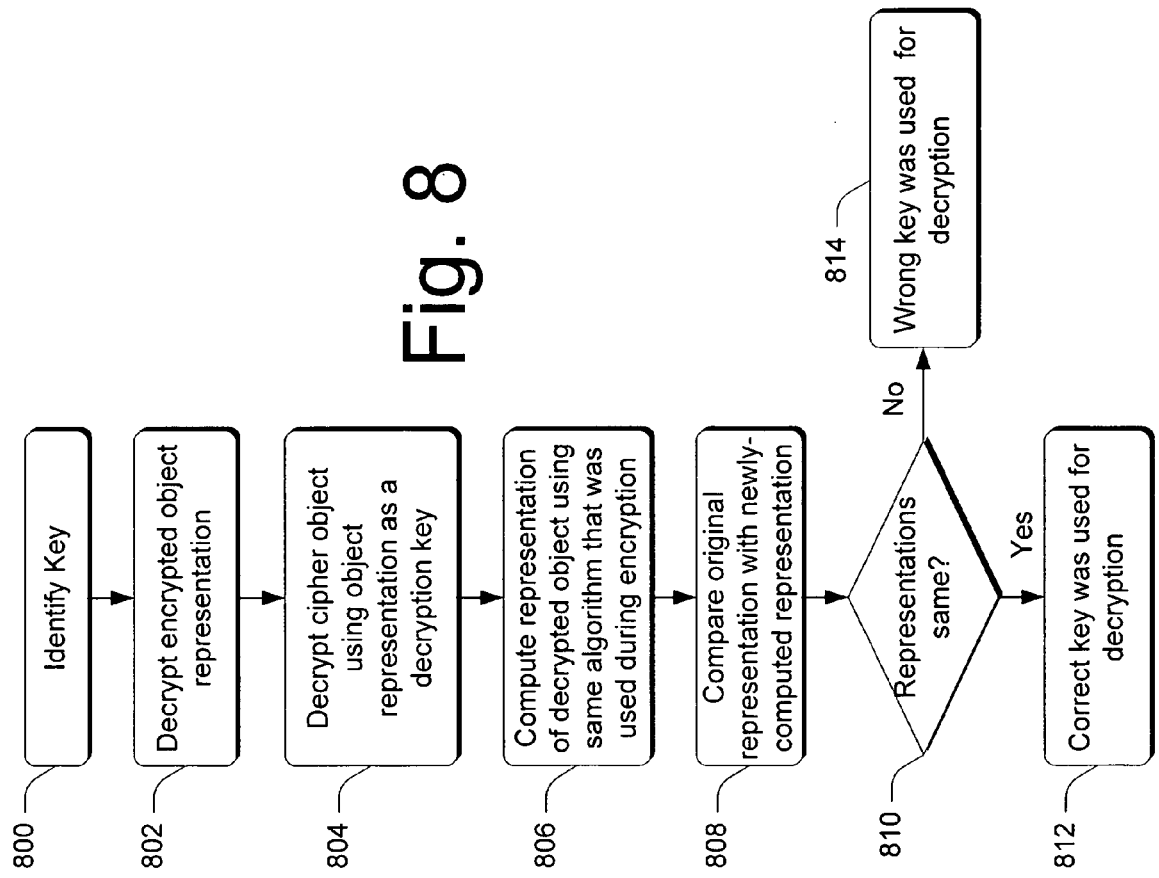

IDENTIFYING AND COALESCING IDENTICAL OBJECTS ENCRYPTED WITH DIFFERENT KEYS

RELATED APPLICATION

This application is a continuation application of and claims priority to U.S. patent application Ser. No. 09/565,821, filed May 5, 2000 now U.S. Pat. No. 6,983,365, the disclosure of which is incorporated by reference.

TECHNICAL FIELD

This invention relates generally to cryptographic protocols, and additionally, to file systems that utilize single instance store (SIS) systems. The invention particularly concerns encryption systems and methods for identifying and coalescing identical objects encrypted with different keys.

BACKGROUND

Computer security, and in particular file security, can be enforced through the use of access control techniques. In a typical computer system, the operating system typically enforces access control by allowing users to set various access lists that determine which users can and cannot access particular files. When a particular user attempts to access a particular file, if they are not authorized to access the file, the operating system will generally not allow them to do so. One problem with an operating system-enforced security method is that it assumes that the operating system has not been compromised. Specifically, if an operating system becomes compromised, it is quite natural to assume that any security measures administered by the operating system have a high degree of likelihood of becoming compromised as well. Thus, access control techniques are to a large extent only as good as the integrity of the operating system that enforces them.

Compounding this problem to a large degree is the tremendous growth in the popularity of personal computers, e.g. lap top computers. Specifically, many times, individuals will store confidential files on their personal or lap top computers. But, because these computers, by their very nature, are quite mobile, the chances that they will be stolen increases. For example, it is less likely that a computer will be stolen from a secure residence, than from a somewhat unsecure hotel room.

Encryption has evolved as a way to protect files in a way that is independent of the integrity of the operating system of the computer. Encryption typically involves encrypting a file with an encryption key before it is stored on the computer's hard disk. The encryption key is not stored on the computer. Anyone who is authorized to view the file can be provided with the appropriate encryption key. Those individuals who are not authorized to view an encrypted file are not provided with the appropriate encryption key. The file cannot be decrypted without the appropriate encryption (or decryption) key. Thus, if a computer (or its operating system) is compromised, the encrypted file is utterly worthless to anyone who does not have the appropriate key to decrypt the file.

While encryption works well at protecting files in computer systems, there are aspects of computer systems to which encryption poses significant challenges. One particular aspect is a so-called single instance store (SIS) system. Specifically, the contents of a file of a file system may be identical to the contents stored in one or more other files. While some file duplication tends to occur on an individual user's personal computer, duplication is particularly prevalent on networks that are set up with a server that centrally stores the contents of multiple personal computers. For example, with a remote boot facility on a computer network, each user boots from that user's private directory on a file server. Each private directory thus ordinarily includes a number of files that are identical to files on other users' directories. Storing the private directories on traditional file systems consumes a great deal of disk and server file buffer cache space. To address the problems associated with storing multiple identical files on a computer, Microsoft developed the single instance store (SIS) system that is packaged as part of the Windows 2000 operating system. The SIS system reduces file duplication by automatically identifying common identical files of a file system, and then merging the files into a single instance of the data having one or more logically separate links thereto that represent the original files. In this way, the storage impact that multiple duplicate files have on a computer system is reduced.

Encryption complicates the SIS methodology in the following way. Assume that each of a number of individuals encrypts an identical file using their own unique key. The encryption of each file yields ciphertext that is itself different from the ciphertext of each of the other encrypted files. When this happens, there is no realistic way to combine the identical files because the ciphertext for each is different. That is, all that the SIS system will see is the different ciphertext for each file. Accordingly, the SIS system will treat the different ciphertexts for each file as constituting a different file when, in actuality, the files that resulted in the ciphertext are identical.

Accordingly, this invention arose out of concerns associated with improving cryptographic protocols. This invention also arose out of concerns associated with improving the efficiency of single instance store file systems in view of the movement toward using cryptography as a means of file protection.

SUMMARY

Cryptographic protocols and methods of employing the same are described. The described protocols advantageously enable two or more identical encryptable objects that are coded for encryption with different keys to be identified as identical without access to either the unencrypted objects or the keys that are utilized in the encryption process. Additionally, the protocols enable two or more identical encryptable objects to be processed with different encryption keys, yet be stored in a manner so that the total required storage space is proportional to the space that is required to store a single encryptable object, plus a constant amount for each distinct encryption key.

In one described embodiment, two or more identical encryptable objects are provided. The identical encryptable objects can comprise any objects that are capable of being encrypted. A hash is computed for each of the encryptable objects using the same hash function. This yields identical hashes each of which is associated with an encryptable object. Each encryptable object is then encrypted with its own hash to provide a cipher object. Each hash is then encrypted with a unique key, e.g. an object owner's key. A convergent cipher object is then constructed for each encryptable object. Each convergent cipher object includes the cipher object corresponding to that encryptable object, each uniquely encrypted hash, and a key identifier that identifies the key that was used to encrypt the encrypted hash. Two or more of these convergent cipher objects may be combined into a compound convergent cipher object that includes a single cipher object that represents all of the original encryptable objects, each uniquely encrypted hash, and a key identifier for each uniquely encrypted hash that identifies the key that was used to encrypt it. Optionally, each of the hashes can be encrypted with a one-way encryption function to provide an undecryptable encrypted hash that can be included in the convergent cipher object.

To ascertain whether two encryptable objects are identical, only their cipher objects need to be examined. That is, identity of the underlying encryptable objects can be determined by examining the cipher objects without having to examine the encryptable objects. The identity of the encryptable objects can be determined with certainty by examining, where provided, their undecryptable encrypted hashes.

Accordingly, many encryptable objects can be represented by individual associated convergent cipher objects. Identical encryptable objects can be effectively merged by examining the individual cipher objects for each convergent cipher object. If the individual cipher objects are found to be identical, then the convergent cipher objects for each of the encryptable objects can be merged to define a single resultant convergent cipher object.

To decrypt a cipher object, the cipher object's encrypted hash is first decrypted using the unique key that was utilized to encrypt it. Once the hash is decrypted, it is used as the key to decrypt the cipher object. This provides the original encryptable object.

In various embodiments, the encryptable objects comprise files and the cryptographic protocols enable encrypted files to be utilized in connection with single instance store (SIS) systems.

BRIEF DESCRIPTION OF THE DRAWINGS

FIG. 7 is a diagrammatic illustration of an exemplary decryption process in accordance with various described embodiments.

FIG. 8 is a flow diagram that describes steps in a method in accordance with the described embodiments.

DETAILED DESCRIPTION

Overview

The inventive methods and systems achieve a cryptographic protocol that has the following properties. First, if two or more encryptable objects are identical, then even if different encryption keys are utilized to encrypt them to provide individual cipher objects, one does not need to have access to any of the encryption keys to determine from an examination of the cipher objects that the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key.

The cryptographic protocol that is discussed just below is advantageously applicable to file systems that utilize single instance stores (SIS). Aspects of single instance stores are discussed below in a section entitled "Use of the Cryptographic Protocol in a File System." An exemplary SIS system is Microsoft's SIS system that is packaged as part of its Windows 2000 operating system. It is to be understood, however, that other SIS systems could utilize the principles discussed below. It is also to be understood that the inventive cryptographic protocol has applicability outside of SIS systems altogether, and that SIS systems are discussed only in the context of an exemplary embodiment. For information on Microsoft's SIS system, the reader is referred to U.S. patent application Ser. Nos. 09/354,624, and 09/354,660, the disclosures of which are incorporated by reference herein.

Exemplary Computer System

Figure 1:
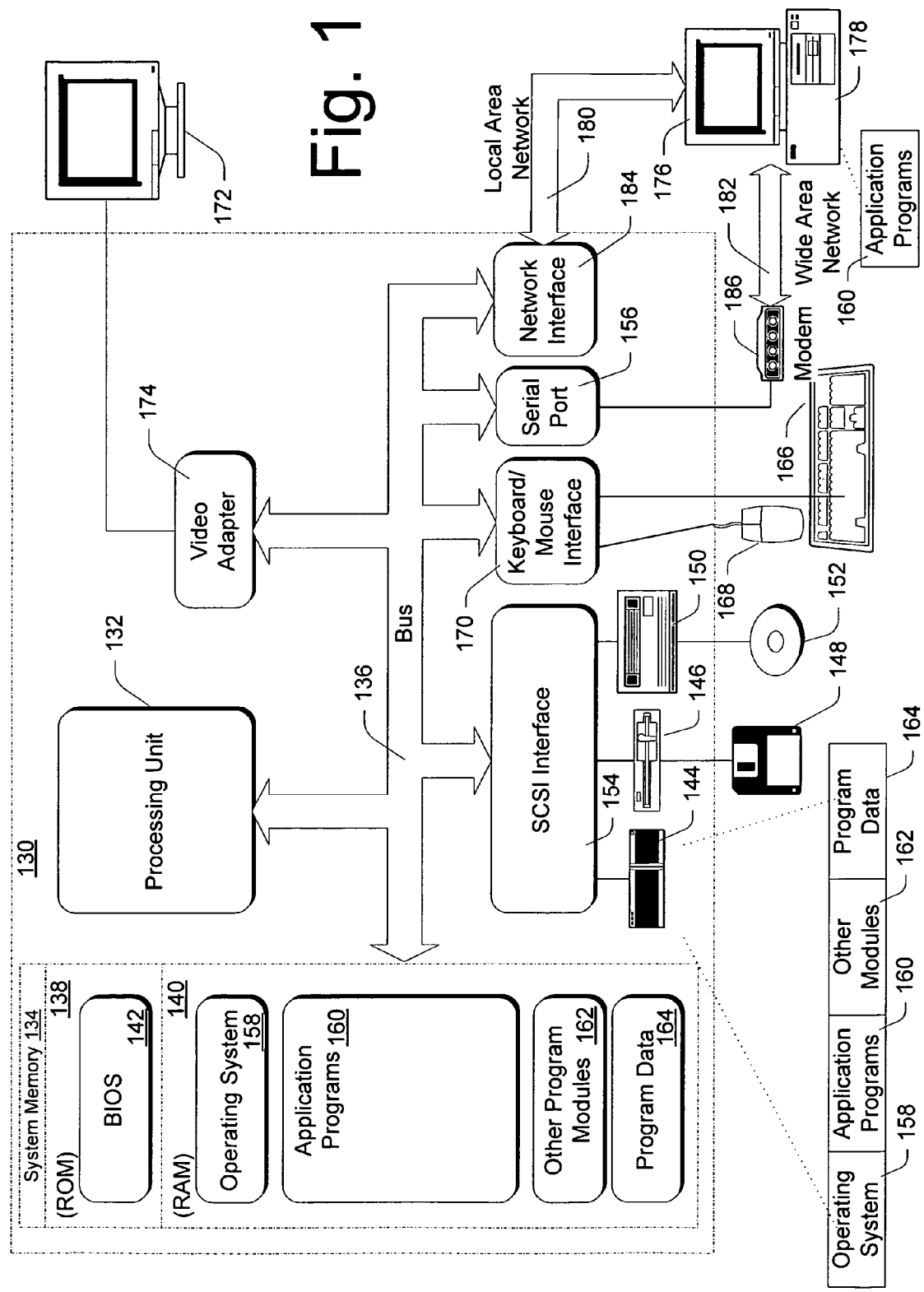
FIG. 1 is a diagram of an exemplary computer system that can be utilized to implement various described embodiments.

Preliminarily, FIG. 1 shows a general example of a computer 130 that can be used to implement the various described embodiments.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Cryptographic Protocol

In the explanation that follows, a cryptographic protocol is presented that satisfies the two properties mentioned above—namely, if two identical encryptable objects are coded for an encryption process with two different keys, it is possible to ascertain that the objects are identical without having access to either the unencrypted encryptable objects or the keys that were used in the encryption process. Additionally, the protocol makes it possible to store only one copy of the encrypted encryptable object which is then decryptable only to those entities that possess the appropriate keys. In the described embodiment, such is made possible by incorporating, along with the encrypted object (referred to herein as a "cipher object"), certain other information as will become apparent below. The cryptographic protocol discussed below is referred to as "convergent encryption" because two or more identical encryptable objects will, when encrypted with not necessarily identical keys, converge to the same cipher object, thereby allowing recognition and coalescing of identical encryptable objects. As used in the context of this document, an "encryptable object" can comprise any object that is capable of being encrypted. Typical examples include, without limitation, messages, documents, files, and the like. A "cipher object" refers to an encryptable object that has been encrypted. In one particular embodiment discussed below, the encryptable object comprises a file in a file system.

Provided Operations

In one illustrated and described embodiment, the following five operations are provided by the inventive methods. Explanation of the five operations makes use of an encryptable object in the form of a plaintext message P.

1. Encryption, in which a plaintext message P is encrypted with an encryption key K and tagged with a key identifier I to produce a ciphertext message C. In notation, $C=E_{K,I}(P)$.

2. Decryption, in which a ciphertext message C is decrypted with a decryption key K to produce a plaintext message P. In notation, $P=D_K(C)$. Note: This decryption key need not be the same as the encryption key used to encrypt message P.

3. Identity recognition, in which it is determined whether two ciphertext messages $C_1$ and $C_2$ have matching plaintext. In notation, $b=R(C_1,C_2)$.

4. Merge, in which two ciphertext messages $C_1$ and $C_2$ with matching plaintext but coded for not necessarily identical sets of encryption keys are merged into a single ciphertext message $C_0$. In notation, $C_0=M(C_1, C_2)$. This operation is composable, so an arbitrary number of ciphertext messages with matching plaintext can be merged by composing the merge operation. In notation, $M(C_1,C_2,C_3, \ldots ,C_n)=M(\ldots M(M(C_1,C_2), C_3) \ldots ,C_n)$ 5. Extraction, in which a ciphertext message $C_0$ coded for a single key corresponding to key identifier I is extracted from a ciphertext message $C_1$ coded for one or more keys. In notation, $C_0=X_I(C_1)$.

Properties of Convergent Encryption

The following two properties are important and useful properties of convergent encryption:

1. If $C_1=E_{K_1,I_1}(P_1)$ and $C_2=E_{K_2,I_2}(P_2)$, then whether P1 equals P2 can be determined by examination of C1 and C2 without knowledge of K1 or K2. This means that the original plaintext messages can be ascertained to be identical (in one embodiment with absolute certainty, and in another embodiment with a very high degree of probability) by examination of the cipher objects, and without knowledge of the keys that were used to encrypt them.

2. If $C_1 = E_{K_1,J_1}(P)$, $C_2 = E_{K_2,J_2}(P)$, ..., $C_n = E_{K_n,J_n}(P)$, and $C_0 = M(C_1, C_2, \ldots, C_n)$, then $L(C_0) \leq Q_1 L(P) + Q_2 n$, where operator L provides the length of a message, and Q1 and Q2 are fixed constant values. This relationship describes the storage needs for storing a cipher object as a representation of all of the cipher objects that have been encrypted that have identical content. What the relationship states is that the storage needs for merged cipher objects are proportional to the size of one of the original encryptable objects, plus a constant amount of storage for each key that was used in the encryption.

Underlying Cryptographic Algorithms

In the discussion that follows, implementation of convergent encryption is based upon underlying cryptographic algorithms. For the subsequent discussion, the following assumptions are made:

1. A first auxiliary encryption function $c = e_k(P)$ encrypts a plaintext message p with an encryption key k to produce a ciphertext message c. This function has the property that $L(c) \leq QL(p) + S$, for some fixed constants Q and S. (Where the term "S" covers so-called padding in connection with encryption algorithms that are "block ciphers" and process only information in fixed sized portions). There are many cryptographic algorithms that could be used for this function, including without limitation, DES, IDEA, and other symmetric-key algorithms.

2. A first auxiliary decryption function $p = d_k(c)$ decrypts a ciphertext message c with a decryption key k to produce a plaintext message p. This function is the inverse of the first auxiliary encryption function.

3. A second auxiliary encryption function $c = e'_k(p)$ encrypts a plaintext message p with an encryption key k to produce a ciphertext message c. This function has the property that $L(c) \leq QL(p) + S$, for some fixed constants Q and S. This function may be the same as the first auxiliary encryption function, or it may be some other symmetric-key algorithm, or it may be a public-key algorithm.

4. A second auxiliary decryption function $p = d'_k(c)$ decrypts a ciphertext message c with a decryption key k to produce a plaintext message p. This function is the inverse of the second auxiliary encryption function. If it is a public-key algorithm, then this decryption key is not the same as the encryption key used to encrypt message p.

5. A one-way hash function $q = h(p)$ non-invertably digests a message p to produce a fixed-size, secure hash value q. There are many one-way hash algorithms that could be used for this function, including SHA, MD5, and others.

6. A one-way encryption function $c = w(p)$ that non-invertably encrypts a fixed-size plaintext message p to produce a fixed-size undecryptable ciphertext message c. One such function is modular exponentiation using a generator in a finite field.

Exemplary Encryption

Figure 2:
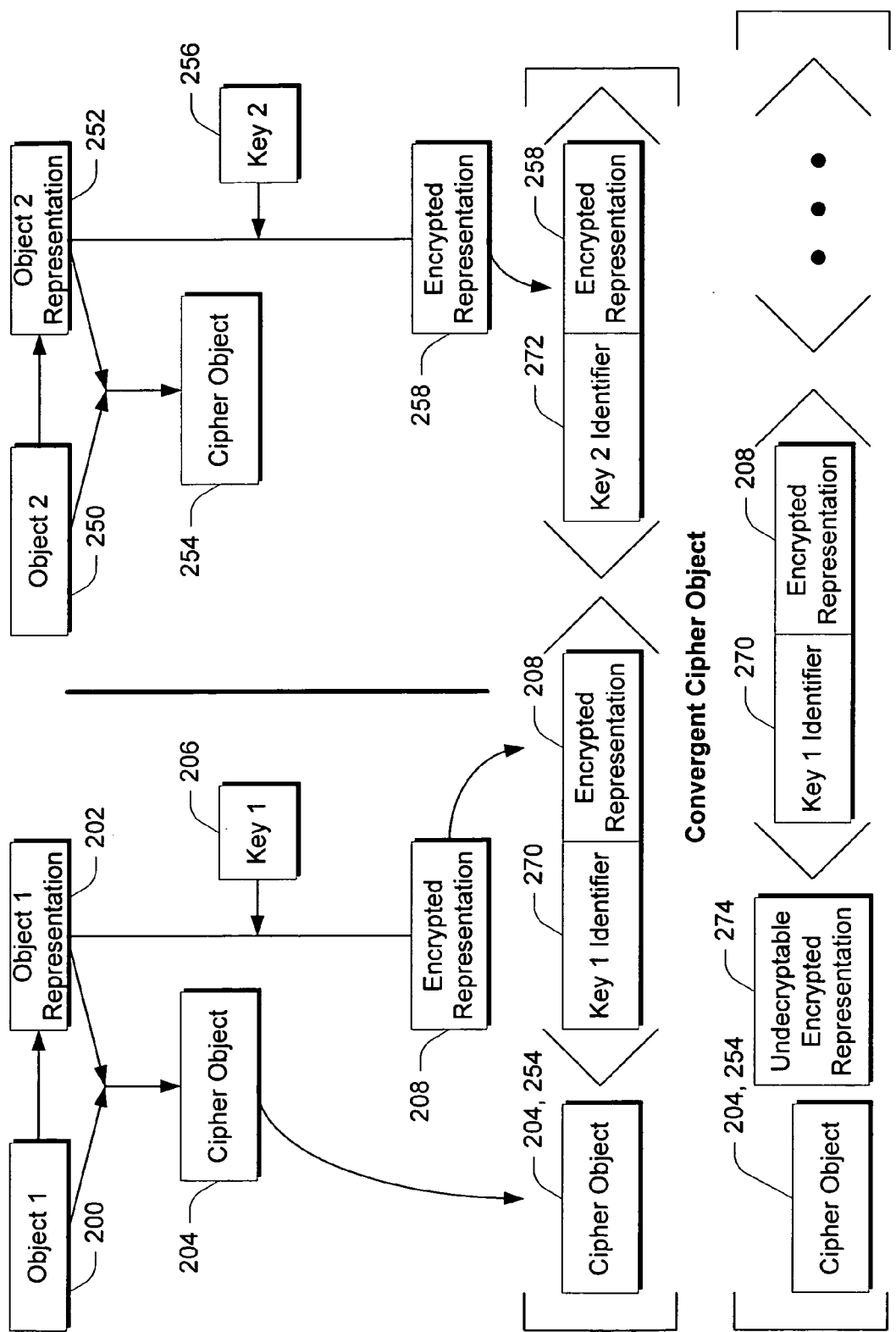
FIG. 2 is a diagrammatic illustration of an exemplary encryption process in accordance with various described embodiments.

FIG. 2 diagrammatically illustrates an exemplary encryption in which two objects—object 200 and object 250 are encrypted and placed into a form that can satisfy the two properties mentioned above. Any number of objects can be utilized. In the described embodiment, the objects are identical and could, for example, constitute identical files or messages.

In the illustrated example, respective representations are made of the objects. Here, object 200 has a representation 202 and object 250 has a representation 252. In the illustrated example, the processing that takes place to produce the representations is the same. In this manner, because the objects 200, 250 are identical, the respective representations 202, 252 will be identical as well. Any suitable representation can be utilized. In the illustrated and described embodiment, the representation is a hash that may or may not be a secure hash. Next, the objects 200, 250 are encrypted using their own respective representations 202, 252 as the encryption key to produce an encrypted or cipher object. Here, object 200 is encrypted with its representation 202 to produce cipher object 204, while object 250 is encrypted with its representation 252 to produce cipher object 254. At this point, the cipher objects 204, 254 are identical because they comprise identical encryptable objects that were each encrypted with identical keys (i.e. the representations, which are hashes of the identical encryptable objects 200, 250). Additionally, given a cipher object such as 204 or 254, it is not computationally feasible to decrypt the cipher object without knowing the key that was used to encrypt it, namely one of the object representations 202 or 252. Furthermore, the object representations 202, 252 can only be generated from the unencrypted forms of the encryptable objects 200, 250.

Each of the representations 202, 252 are then encrypted with respective keys 206, 256. Keys 206, 256 can comprise individual keys of the owner's of objects 200, 250 respectively. Thus, in the example where the representations comprise hashes, each hash is encrypted with a key to yield an encrypted representation. In this example, different keys are used to encrypt the representations. So, for example, key 206 is used to encrypt representation 202 to produce an encrypted representation 208, while key 256 is used to encrypt representation 252 to provide encrypted representation 258. Each of these encrypted representations is different.

Next, a convergent cipher object is constructed by associating a single cipher object (either object 204 or 254) with a list (or other data structure) that contains other information that identifies the respective keys that were used to encrypt the object representations, as well as the encrypted representations. In the illustrated example, a convergent cipher object contains a single cipher object 204 (254) as well as a list that contains a first ordered pair (with key identifier 270 and encrypted representation 208) and a second ordered pair (with key identifier 272 and encrypted representation 258). Each of the key identifiers uniquely identifies the keys with which it is associated. Accordingly, key identifier 270 uniquely identifies key 206, while key identifier 272 uniquely identifies key 256. In this example, as will be shown in the "Identity Recognition" section below, there is a high degree of likelihood that if the cipher objects are equivalent, their corresponding encryptable objects are equivalent as well. This determination can be made without access to either the encryptable objects or the keys that were used to encrypt the object representations.

One embodiment determines with certainty that the corresponding encryptable objects are identical. Here, each of the representations 202, 252 is further encrypted with a one-way encryption function to produce an undecryptable encrypted representation or value 274. The undecryptable encrypted value 274 is then incorporated into the alternate convergent cipher object as shown in FIG. 2.

It will be appreciated that if the encryption of one object (say P1) with an object representation (say q1) yields the same value as the encryption of another object (say P2) with an object representation (say q2), if q1=q2, then P1 must equal P2.

Figure 3:
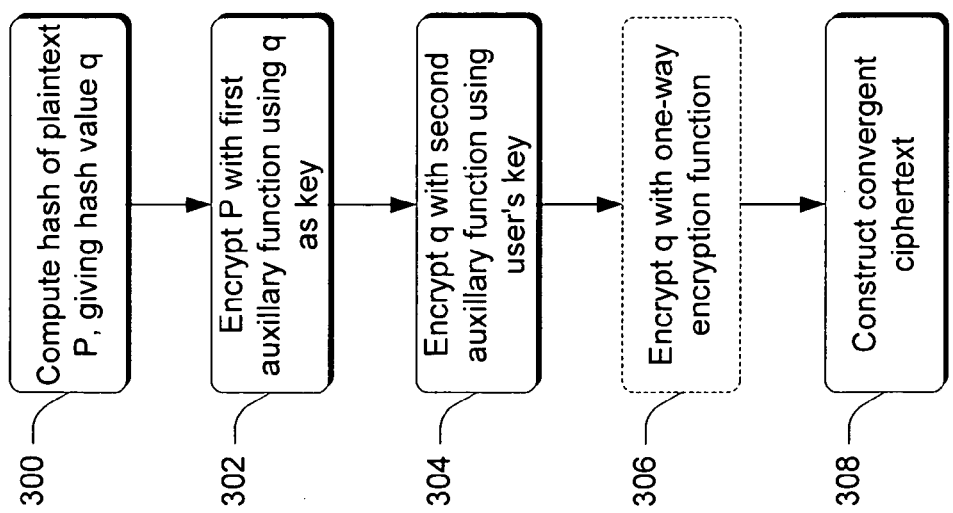
FIG. 3 is a flow diagram that describes steps in a method in accordance with the described embodiments.

FIG. 3 shows a flow diagram that describes steps in one encryption method in accordance with the described embodiment. The description given just below uses the definitions given in the "Underlying Cryptographic Algorithms" section above. In this example, a plaintext message P is encrypted with an encryption key K and tagged with a key identifier I to produce a convergent ciphertext message C, where $C=E_{K,I}(P)$. Step 300 computes a secure hash q of plaintext P: $q=h(P)$. Zero or more bits of the value q can be discarded, although preferably no bits are discarded. Step 302 encrypts plaintext P with the first auxiliary encryption function, using secure hash value q as the encryption key. This produces ciphertext c: $c=e_q(P)$. Step 304 encrypts secure hash value q with the second auxiliary encryption function, using encryption key K to produce encrypted hash value u: $u=e'_K(q)$. Step 306 optionally encrypts secure hash value q with the one-way encryption function to produce undecryptable encrypted hash value z: $z=w(q)$. Step 308 then constructs or builds convergent ciphertext C as an ordered tuple, with ciphertext c as the first element, undecryptable encrypted hash value z as the second element, and a list as the third element. In one embodiment, the second element z of the tuple can be omitted in this and all other operations. The list contains one ordered pair, with key identifier I as the first element and encrypted hash value u as the second element: $C=(c,z,\langle(I,u)\rangle)$.

Identity Recognition

The above-described convergent encryption methods make it possible to determine whether two or more encryptable objects, e.g. plaintext messages, are identical without the need to examine the encryptable objects themselves. By examining the cipher objects, one is able to ascertain whether the encryptable objects are identical. In one embodiment, examination of only the cipher objects enables identity to be determined with a high degree of probability. In another embodiment, examination of the cipher objects and some additional information makes it possible to determine identity with certainty.

The convergent encryption procedure for identity recognition, in which it is determined whether two ciphertext messages $C_1$ and $C_2$ have matching plaintext, is as follows: $b=R(C_1,C_2)$. Convergent ciphertext message $C_1$, which is the encryption of plaintext $P_1$, is given as an ordered tuple, with ciphertext $c_1$ as the first element, undecryptable encrypted hash value $z_1$ as the second element, and a list of m ordered pairs as the third element:

$$C_1 \equiv E(P_1) \equiv (c_1, z_1, \langle(I_1,u_1),(I_2,u_2), \ldots ,(I_m,u_m)\rangle)$$

It should be appreciated that although a list is used for exemplary purposes as the third element, other data structures could be implemented such as a tree, a hash table, or some other data structure. Convergent ciphertext message $C_2$, which is the encryption of plaintext $P_2$, is given as an ordered tuple, with ciphertext $c_2$ as the first element, undecryptable encrypted hash value $z_2$ as the second element, and a list of n ordered pairs as the third element:

$$C_2 \equiv E(P_2) \equiv (c_2, z_2, \langle(J_1,v_1),(J_2,v_2), \ldots ,(J_n,v_n)\rangle)$$

A value of TRUE is assigned to result b if and only if $c_1=c_2$ and $z_1=z_2$; a value of FALSE is assigned to result b otherwise: $b=(c_1=c_2)^\wedge(z_1=z_2)$ In the embodiment in which z is omitted from the tuple, a value of PROBABLY TRUE is assigned to result b if and only if $c_1=c_2$; a value of FALSE is assigned to result b otherwise. In this embodiment, it is not possible to tell for certain that $P_1$ equals $P_2$, because there is a non-zero (albeit extremely small) probability that two distinct messages, $P_1$ and $P_2$, could yield two distinct secure hash values, $q_1=h(P_1)$ and $q_2=h(P_2)$, that, when used as respective encryption keys, encrypt the distinct messages to identical ciphertexts, $c=e_{q_1}(P_1)$ and $c=e_{q_2}(P_2)$.

Figure 4:
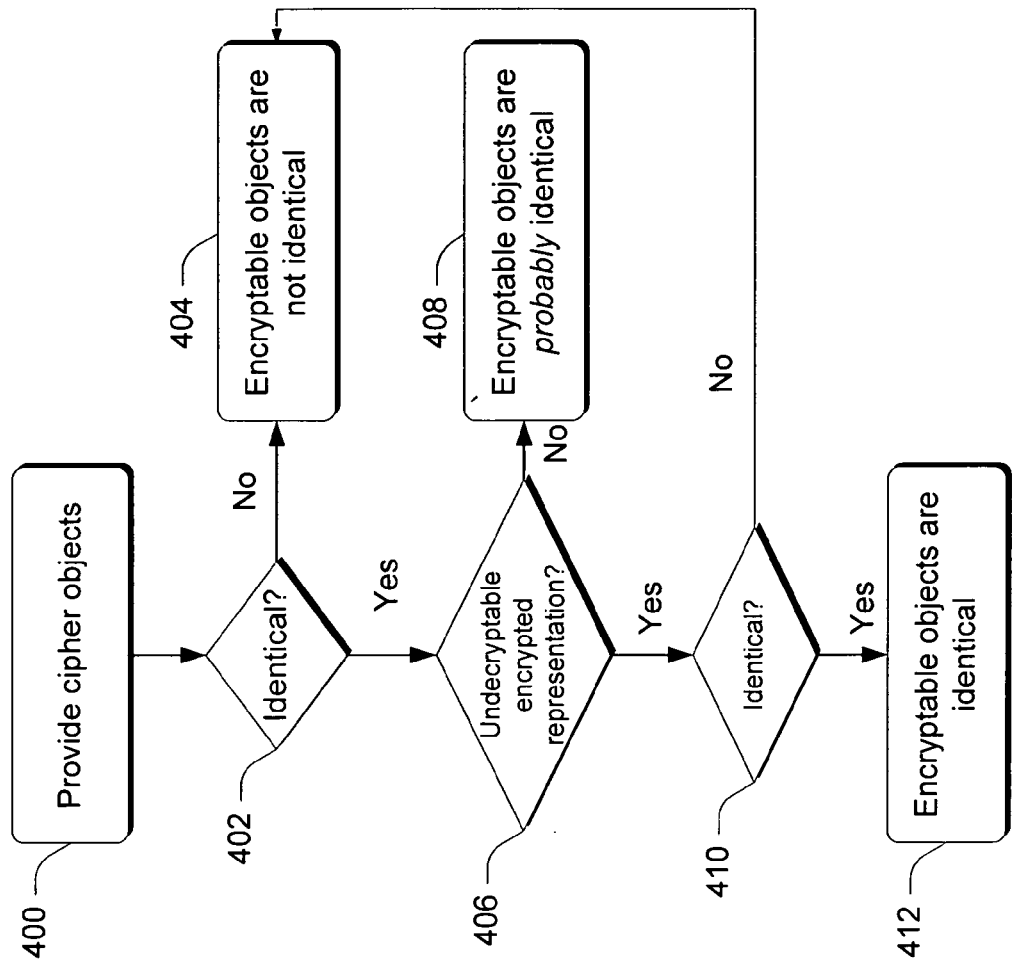
FIG. 4 is a flow diagram that describes steps in a method in accordance with the described embodiments.

FIG. 4 is a flow diagram that describes steps in an identification method in accordance with the described embodiment. Step 400 provides two or more cipher objects that have been encrypted and processed to provide multiple ordered tuples or convergent cipher objects in accordance with the "Exemplary Encryption" section above. In one embodiment, each ordered tuple contains a single cipher object and the list (or other data structure) as described above. In another embodiment, each ordered tuple contains an additional element z that is the undecryptable encrypted representation value (i.e. hash value). Step 402 determines whether the cipher objects in each of the ordered tuples are identical. If the cipher objects are not identical, then step 404 concludes that the encryptable objects that correspond to the cipher objects are not identical. If, on the other hand, step 402 determines that the cipher objects in each of the order tuples are identical, then step 406 determines whether the ordered tuples contain undecryptable encrypted representations (i.e. element z). If there are no undecryptable encrypted representations, then step 408 concludes that the corresponding encryptable objects are probably identical with a very high probability. If there are undecryptable encrypted representations, then step 410 determines whether the undecryptable encrypted representations are identical. If the undecryptable encrypted representations are not identical, then the method branches to step 404. If the undecryptable encrypted representations are identical, then step 412 concludes with certainty that the corresponding encryptable objects are identical.

In these embodiments, the identity determinations can be made without accessing the corresponding encryptable objects. Only the cipher objects and, in some instances, other information is used to make the identity determination.

Merging

Convergent encryption makes it possible to merge two or more identical objects that have been coded for not necessarily identical sets of encryption keys. The convergent encryption procedure for a merge operation, in which two convergent ciphertext messages $C_1$ and $C_2$ with matching plaintext but coded for not necessarily identical sets of encryption keys are merged into a single convergent ciphertext message $C_0$, is as follows: $C_0=M(C_1,C_2)$ Convergent ciphertext message $C_1$ is given as an ordered tuple, with ciphertext c as the first element, undecryptable encrypted hash value z as the second element, and a list of m ordered pairs as the third element:

$$C_1 \equiv (c, z, \langle(I_1,u_1),(I_2,u_2), \ldots ,(I_m,u_m)\rangle)$$

Convergent ciphertext message $C_2$ is given as an ordered tuple, with ciphertext c as the first element, undecryptable encrypted hash value z as the second element, and a list of n ordered pairs as the third element:

$$C_2 \equiv (c, z, \langle(J_1,v_1),(J_2,v_2), \ldots ,(J_n,v_n)\rangle)$$

Convergent ciphertext $C_0$ is constructed or built as an ordered tuple, with ciphertext c as the first element, undecryptable encrypted hash value z as the second element, and a list of l ordered pairs as the third element. The list is the union of the lists from $C_1$ and $C_2$:

$$C_0 = (c, z, \langle(H_1, t_1), (H_2, t_2), \ldots, (H_l, t_l)\rangle) \therefore$$
$$\begin{cases} \forall\, x \le m\ \exists\, y : (I_x, u_x) = (H_y, t_y) \\ \forall\, x \le n\ \exists\, y : (J_x, v_x) = (H_y, t_y) \end{cases}$$

In the embodiment in which z is omitted from the tuple, although it is not possible to tell for certain that two ciphertexts have matching plaintexts, merging non-identical messages with identical ciphertext does not pose a problem, because each message will be decrypted with the appropriate key to produce the proper plaintext.

Figure 5:
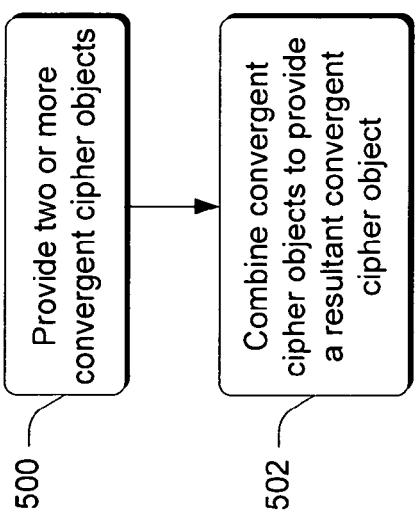
FIG. 5 is a flow diagram that describes steps in a method in accordance with the described embodiments.

FIG. 5 is a flow diagram that describes a merging method in accordance with the described embodiment. Step 500 provides two or more convergent cipher objects. Each of the convergent cipher objects has at least a single cipher object and a list (or data structure) as described above. Each single cipher object corresponds to an identical encryptable object. In one embodiment, each convergent cipher object has an additional element z that comprises the undecryptable encrypted representation. Step 502 combines the two or more convergent cipher objects to provide a resultant convergent cipher object that includes at least (a) a single cipher object that represents all of the cipher objects from each of the two or more convergent cipher objects, and (b) a list (or data structure) that constitutes the union of lists from each of the two or more convergent cipher objects. In the embodiment in which each of the convergent cipher objects contains the z element, the resultant convergent cipher object contains a z element as well.

Extraction

Convergent encryption also makes it possible to extract a single convergent cipher object (or its corresponding cipher object) from a merged resultant convergent cipher object. The convergent encryption procedure for extraction, in which a convergent ciphertext message $C_0$ coded for a single key corresponding to key identifier I is extracted from a convergent ciphertext message $C_1$ coded for one or more keys, is as follows: $C_0 = X_1(C_1)$.

Convergent ciphertext message $C_1$ is given as an ordered tuple, with ciphertext c as the first element, undecryptable encrypted hash value z as the second element, and a list of ordered pairs as the third element:

$$C_1 = (c, z, \langle(I_1, u_1), (I_2, u_2), \ldots, (I_n, u_n)\rangle)$$

Convergent ciphertext $C_0$ is constructed as an ordered tuple, with ciphertext c as the first element, undecryptable encrypted hash value z as the second element, and a list as the third element. The list contains the one ordered pair from the list in convergent ciphertext $C_0$ whose first element matches key identifier I:

$$C_0 = (c, z, \langle(I_x, u_x)\rangle) \therefore I_x = I$$

Figure 6:
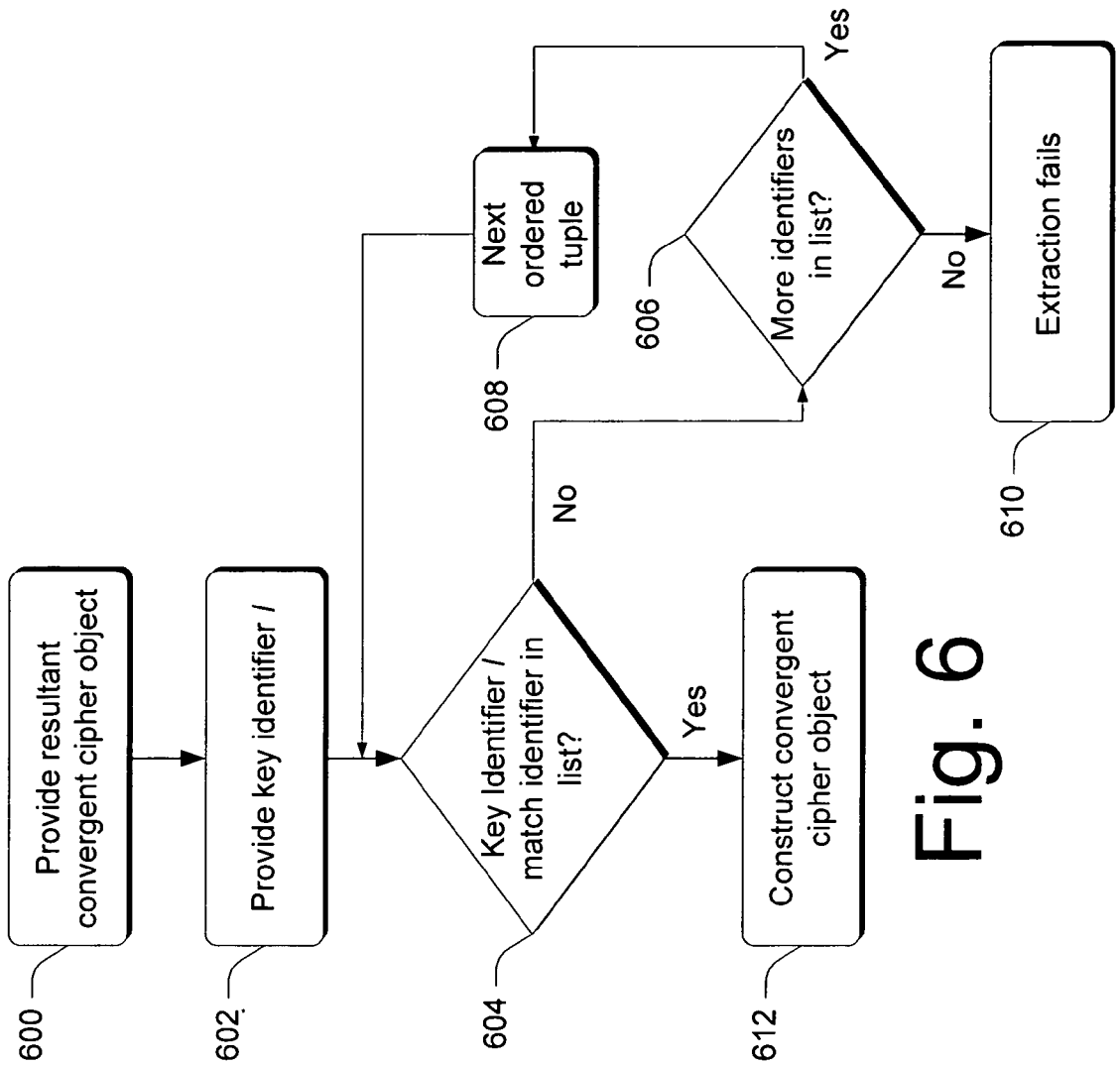
FIG. 6 is a flow diagram that describes steps in a method in accordance with the described embodiments.

FIG. 6 is a flow diagram that describes steps in an extraction method in accordance with the described embodiment. Step 600 provides a resultant convergent cipher object as set forth in the "Merging" section above. The resultant convergent cipher object contains a single cipher object c that represents all of the identical encryptable objects, and at least a list that represents a union of the lists from each of the convergent cipher objects that were merged to produce the resultant convergent cipher object. In one embodiment, the resultant convergent cipher object also contains an element z that is the undecryptable encrypted representation. Step 602 provides a key identifier I that represents a key that was used to encrypt the encrypted representation (e.g. encrypted representation 270 in FIG. 2). Step 604 checks the key identifier I against the key identifier in each of the ordered tuples that constitutes the resultant convergent cipher object. If the key identifier I does not match an identifier in the list, step 606 determines whether there are any additional identifiers in the list. If there are additional identifiers in the list, then step 608 moves onto the next ordered tuple and returns to step 604. If there are no additional identifiers in the list and if no matches are found, then the extraction fails (step 610). If, on the other hand, step 604 finds an identifier in the list that matches the key identifier I, then step 612 constructs a convergent cipher object that includes the single cipher object, the list having the matching key identifier, and optionally, the element z.

Decryption

FIG. 7 diagrammatically illustrates an exemplary decryption process in which cipher object 204 is to be decrypted to produce the original encryptable object 200. The decryption that is discussed below uses the example of FIG. 2. In this example, key identifier 270 is utilized to ascertain key 206. Using key 206 as a decryption key, encrypted representation 208 is decrypted to produce the original object representation 202. In the encryption example above, an exemplary original object representation is a hash of the encryptable object. Once the original representation 202 has been decrypted using key 206, the cipher object 204 is decrypted using the original representation as the decryption key.

FIG. 8 shows a flow diagram that describes steps in one decryption method in accordance with the described embodiment. The description given just below uses the definitions given in the "Underlying Cryptographic Algorithms" section above. The convergent encryption procedure for decryption, in which a convergent ciphertext message C is decrypted with a decryption key K to produce a plaintext message P, is as follows: $P = D_K(C)$.

Convergent ciphertext message C is given as an ordered tuple, with ciphertext c as the first element, undecryptable encrypted hash value z as the second element, and a list as the third element. The list contains one ordered pair, with key identifier I as the first element and encrypted hash value u as the second element: $C \equiv (c, z, \langle(I, u)\rangle)$.

Step 800 identifies the key that is associated with the key identifier that is contained in the list. Step 802 decrypts the encrypted representation (i.e. encrypted hash value u) with the second auxiliary decryption function, using decryption key K to produce secure hash value q: $q = d'_K(u)$. If e' and d' are a public key algorithm, then the K used in this step will not be the same as the K used in step 304 of the encryption process, but instead will be the private key matching the public key used in step 304. Step 804 decrypts ciphertext c with the first auxiliary decryption function, using secure hash value q as the decryption key to produce plaintext P: $P = d_q(C)$.

One important thing to notice is that here, the direct decryption of the cipher object is not done using the user's key. Rather, the direct decryption uses only the decrypted hash of the encryptable object. Another important thing to notice is that the size of the cipher object is proportional to the size of the original encryptable object, and that each encryption key (e.g. the hash of the original object) is a constant size regardless of the size of the original encryptable object. The latter observation is useful when the described encryption protocol is utilized in connection with a single instance store (SIS) file system, discussed in more detail below. The remainder of FIG. 8 is used in the "Error Checking" section just below.

Error Checking

One aspect of the described embodiment provides for error checking that ensures that the decrypted cipher object has been decrypted using the correct decryption key. As background, consider that many decryption algorithms simply decrypt an encrypted object using the key that is provided to the algorithm. If an incorrect key is provided, the algorithm will simply decrypt the encrypted object using the incorrect key to provide an inaccurate decrypted object. The algorithm has no way of determining whether the decryption key is the correct key.

FIG. 8 shows steps in an error-checking method in accordance with the described embodiment. The error-checking processing takes place subsequent to decrypting the cipher object (step 804). Step 806 computes a representation of the decrypted cipher object using the same algorithm that was used during the encryption processing (i.e. step 300 in FIG. 3). In the illustrated example, the representation is a hash of the encryptable object. Accordingly, here a hash of the decrypted cipher object can be computed using the same hashing algorithm as was used in the encryption process. Step 808 compares the newly-computed representation with the original representation (202 in FIGS. 2 & 7), and step 810 determines whether the representations are the same. If the representations are the same, then step 812 concludes that the key that was used to decrypt the cipher object was the correct key. If, however, step 810 determines that the representations are not the same, then step 814 concludes that the wrong key was used to decrypt the cipher object.

The described error checking provides an added degree of certainty to the described encryption protocol because it enables one to ascertain whether the decryption key is in fact the correct decryption key.

Use of the Cryptographic Protocol in a File System

One advantage of the described encryption protocol is its use in connection with a file system that uses a single instance store (SIS) system to reduce storage demands stemming from duplicate files. Recall that a SIS system essentially reduces the storage demands of a file system by recognizing that duplicate files can be stored as a single instance with logically separate and independent links thereto that represent the original files. An exemplary SIS system is described in U.S. application Ser. Nos. 09/354,624 and 09/354,660.

Figure 9:
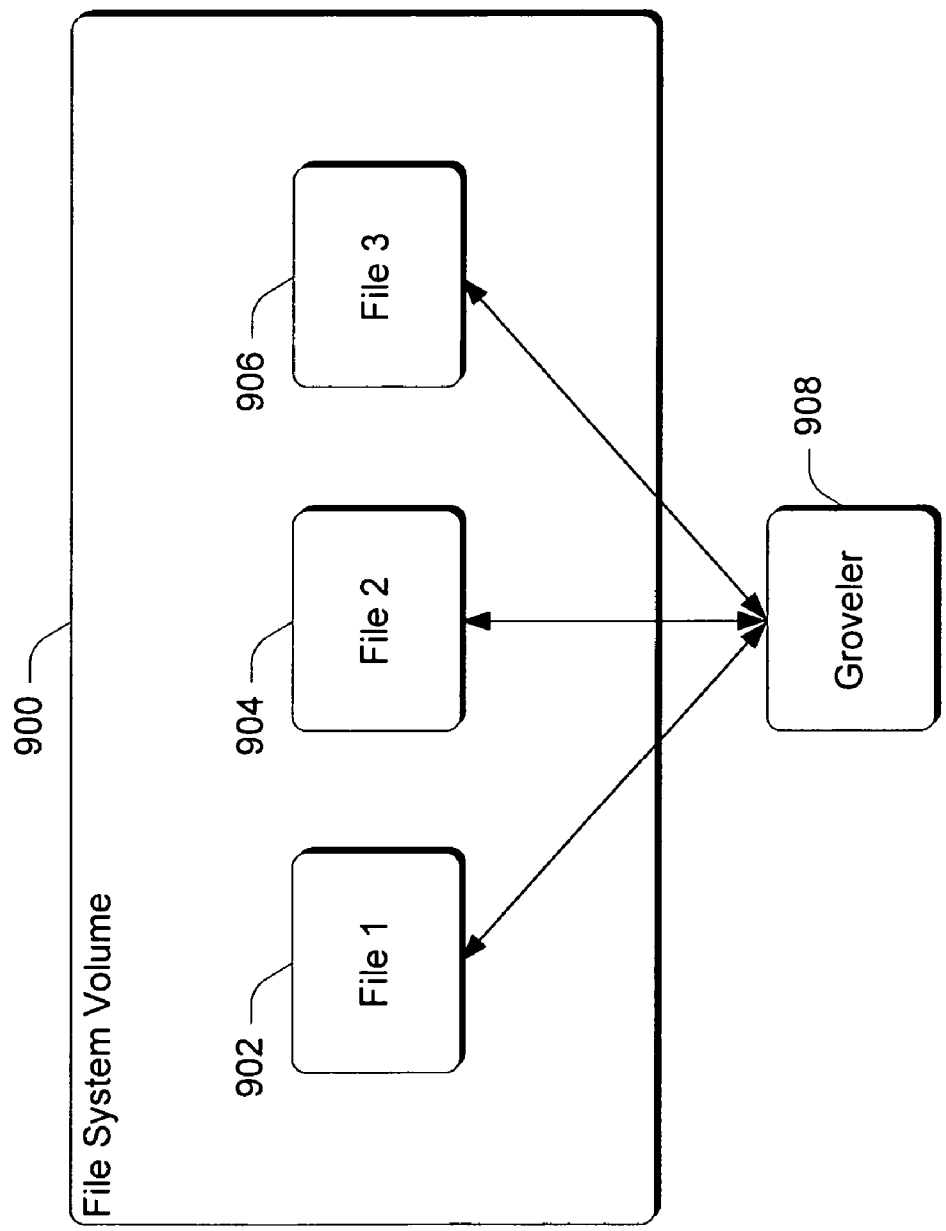
FIG. 9 is an illustration of an exemplary single instance store (SIS) system in which various of the described embodiments can be used.
Figure 10:
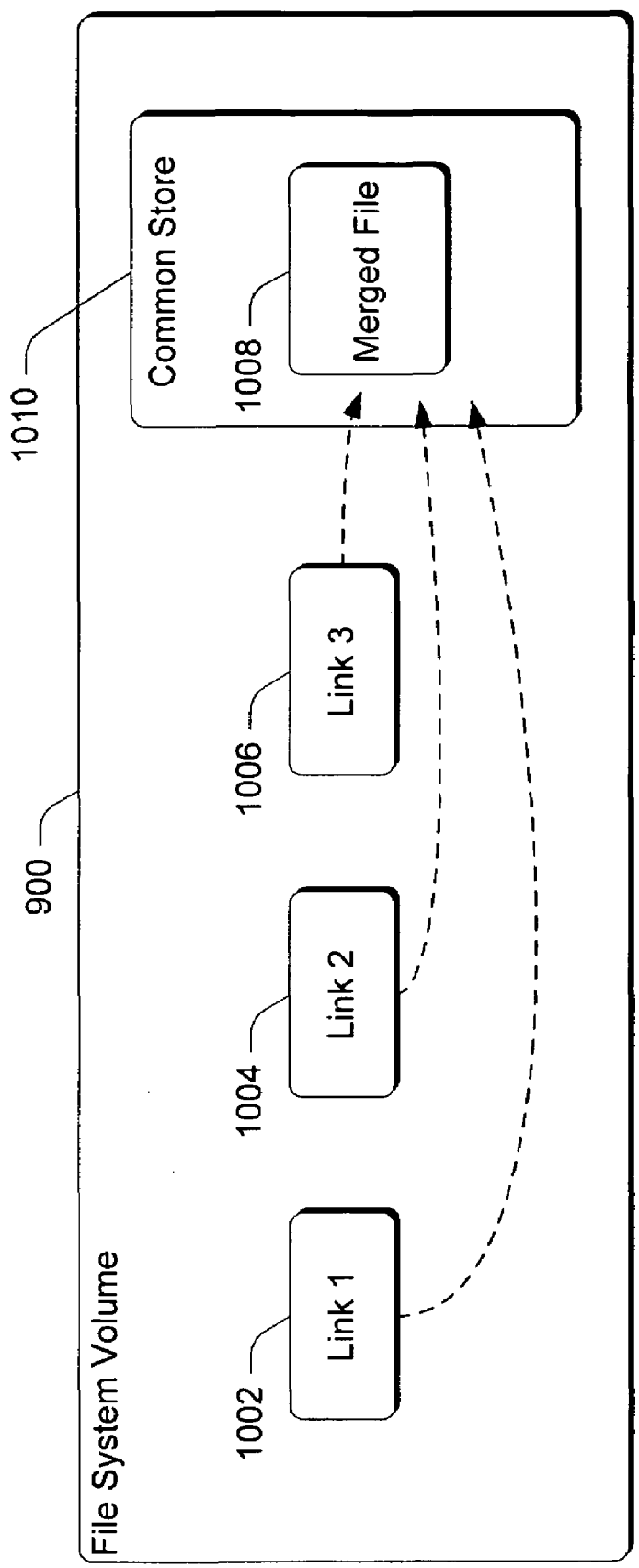
FIG. 10 is an illustration of the FIG. 9 SIS system.

FIGS. 9 and 10 diagrammatically illustrate an exemplary SIS system and the principles upon which it might operate. FIG. 9 shows two primary components, a file system volume 900 and a groveler component 908. The groveler component 908 is implemented in software. The file system volume 900 can include numerous files, exemplary ones of which are shown at 902, 904, and 906. In this example, each of the files 902, 904, and 906 is identical. The groveler component 908 is programmed to find files having duplicate data in the file system volume 900. One way to do this is to compute a signature for each file and then compare the signatures for the files. Any duplicate signatures likely indicate a duplicate file. For any duplicate files, the groveler component 908 can further conduct a byte-by-byte comparison of the files to ensure that their data are identical. When the groveler component 908 confirms identical files, it initiates a merging activity that merges the files into a single instance of data and provides links or link files for each of the identical files. For example, FIG. 10 shows file system volume 900 as including links 1002, 1004, and 1006. Each individual link corresponds to a individual respective file 902, 904, and 906 in FIG. 9. None of the links contains its original file data. Instead, each link references a single instance merged file 1008 that is resident in a common store 1010. The single instance merged file contains the original file data for the identical files 902, 904, and 906 (FIG. 9). Users can now operate on the links instead of their individual duplicate files. Examples of one particular SIS implementation in connection with the Windows NT file system is described in the applications incorporated by reference above.

As mentioned above, when individual identical files are encrypted with different encryption keys, SIS systems cannot typically determine that they are identical. This is because the resulting ciphertext of the encrypted files is itself different (as being generated by different encryption keys). Thus, when the exemplary groveler component 908 computes a signature of the different ciphertexts, each signature is different as well. Accordingly, it then appears to the groveler component 908 as if the files are in fact different when they are in actuality identical. Thus, the identical files are not combined.

Advantageously, through the use of the above described inventive cryptographic protocol, identical files can now be coded for encryption with different keys, yet still be determined to be identical without having to reference the unencrypted files. Specifically, by referencing the ciphertext of the files, the files can now be determined to be identical. These identical files can be operated upon and merged, as described above, thereby preserving the advantages of the SIS system, even when files are encrypted.

Exemplary Implementation

In one particular implementation, each file can be represented by more than one stream of bytes. Windows NT file system is one such file system where this is the case, as will be understood by those of skill in the art. In this example, each file comprises a primary stream and one or more auxiliary streams. When a file is encrypted to provide a cipher object, the corresponding cipher text is maintained in the primary stream. The auxiliary streams are used to maintain the corresponding information that is associated with the cipher text, e.g. the list of ordered pairs. Each of the primary streams can then be examined to determine whether the ciphertext in each stream is identical. If the cipher text in each primary stream is identical, then a convergent cipher object (i.e. ordered tuple) can be built by merging the primary streams into a resultant stream, and using each associated auxiliary stream to build the ordered pairs that comprise the tuple.

Figure 11:
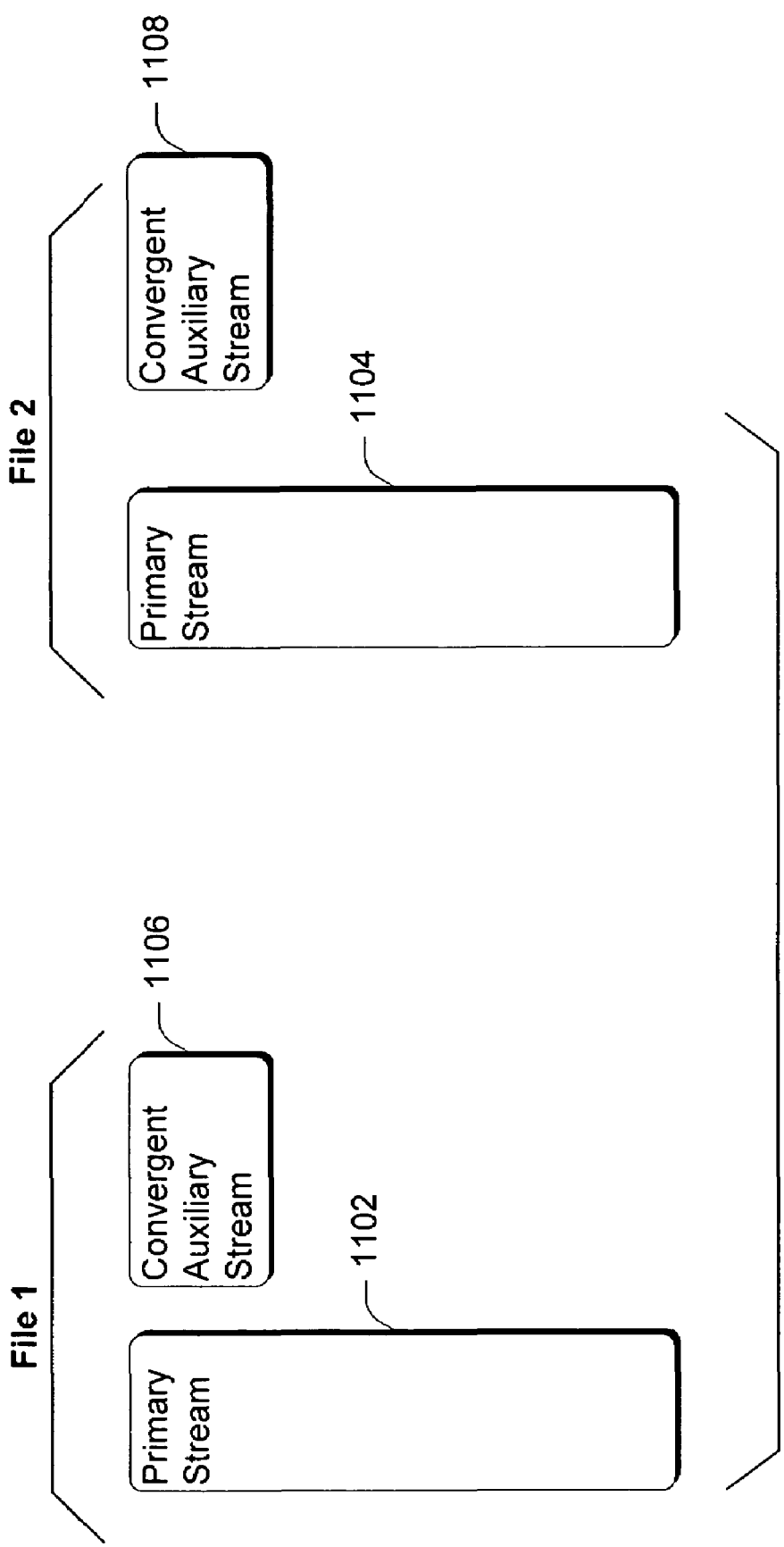
FIG. 11 is a diagrammatic illustration that assists in understanding how various embodiments can be implemented in accordance with an exemplary SIS system.

As an example, consider FIG. 11, showing two exemplary files. Each file is encrypted as described above in the section entitled "Exemplary Encryption." (For brevity's sake, the encryption process will not be again described here.) The resulting cipher object is stored in the primary stream 1102, 1104 of the file, and the encrypted representation is stored in an auxiliary stream 1106, 1108 of the file. A key identifier could also be stored in this auxiliary stream, or the key identifier could be implicitly associated with the name of the file.

Figure 12:
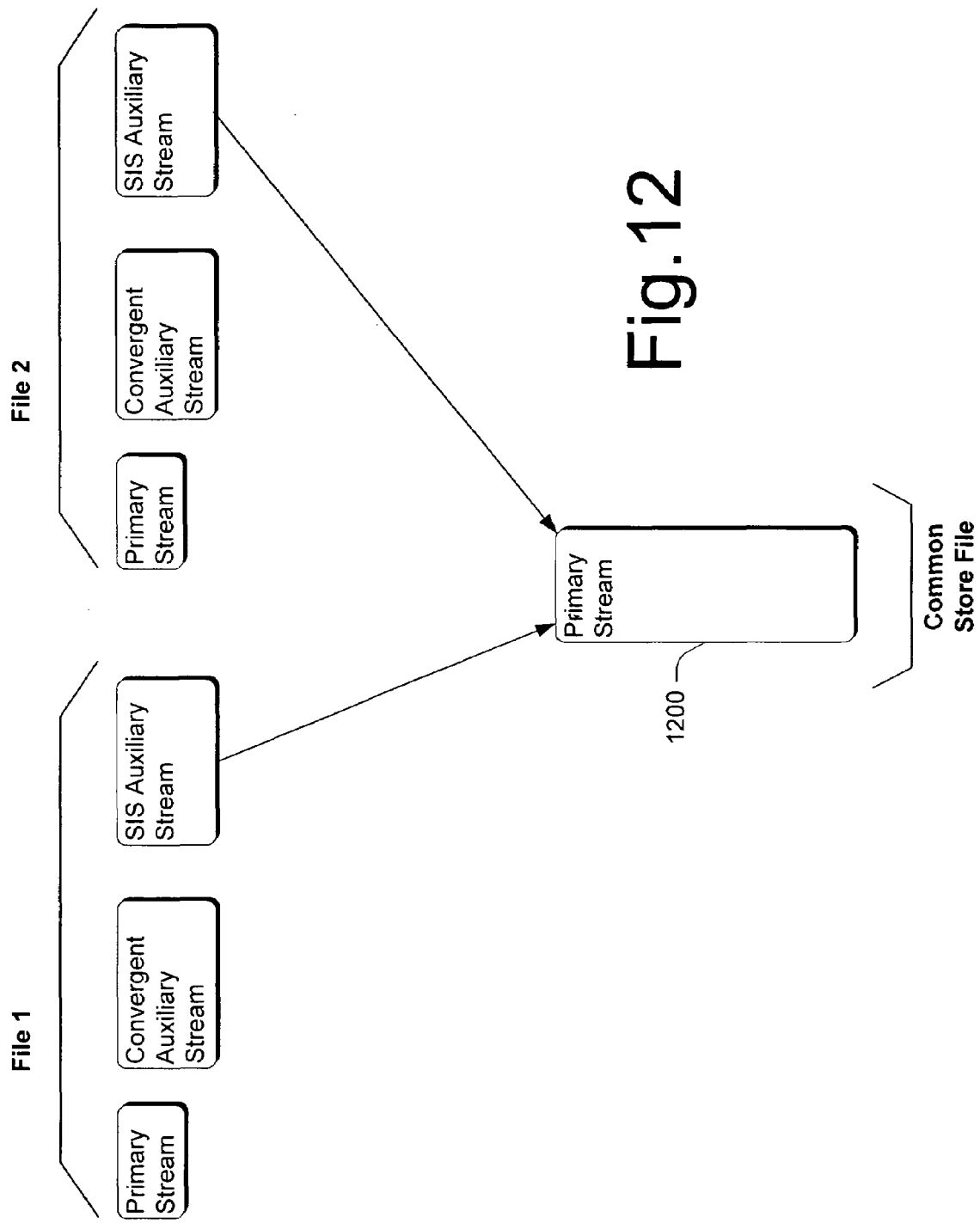
FIG. 12 is a diagrammatic illustration that assists in understanding how various embodiments can be implemented in accordance with an exemplary SIS system.

FIG. 12 illustrates the state of the file system after the groveler component has merged the files in accordance with the description in the above section entitled "Merging." (For brevity's sake, the merging process will not be again described here.) Since the primary streams of the two files are identical, the content of one of the primary streams is copied to the primary stream 1200 of a common store file. The single instance store (SIS) component of the file system adds another auxiliary stream (here, the "SIS" auxiliary stream) to each file that indicates that the contents of the file are to be found in the common store file.

The files can be further processed in accordance with the descriptions in each of the sections entitled "Identity Recognition", "Extraction", "Decryption", and "Error Checking". For brevity sake, these sections will not be again described.

File Segmentation

One particularly advantageous aspect of the described embodiment recognizes that there are times when only a portion of a file might be needed. In these instances, it would be inefficient to open and read an entire file's contents simply to gain access to the needed portion. In accordance with this embodiment, one or more files are segmented into individual portions. Each individual portion of the file is then treated as if it were a separate file. That is, each file portion is separately encrypted and processed as described above. The result of this operation is that for each file portion, there is a corresponding ordered tuple that contains a cipher object and its associated information (i.e. list). Each of the individual file portions can then be independently processed as described above.

In selecting the size of the segments the following considerations should be taken into account. First, if the segmentation sizes are too large, then the overhead associated with updating a segment becomes large in relation to the segment size. Second, if the segmentation sizes are too small, then the space used to store the keys that are used in the encryption process becomes large in relation to the segmentation size. In practice, a segmentation size from between 4 to 64 Kbytes has been found to be adequate.

CONCLUSION

The inventive methods and systems described above achieve a cryptographic protocol that has the following properties. First, if two or more encryptable objects are identical, then even if different encryption keys are used in an encryption process that provides individual cipher objects, one does not need to have access to any of the encryptable objects or encryption keys to determine whether the encryptable objects are identical. Second, if two or more encryptable objects are identical but are encrypted with different encryption keys, the total space that is required to store all of the cipher objects is proportional to the space that is required to store a single encryptable object, plus a constant amount of storage for each distinct encryption key. The described cryptographic protocol can be particularly advantageously employed in the context of file systems that use single instance stores (SIS).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An encryption method comprising:
   computing a representation for each of two or more encryptable objects;
   encrypting each of the encryptable objects using its own representation as an encryption key, said encrypting defining a plurality of cipher objects each of which corresponds to an encryptable object;
   encrypting multiple representations with individual unique keys;
   ascertaining from the cipher objects whether the corresponding encryptable objects are identical; and
   constructing a convergent cipher object that includes a cipher object corresponding to identical encryptable objects, each encrypted representation, and a key identifier for each key used to encrypt a representation.

2. The encryption method of claim 1, wherein said computing of the representation comprises computing hashes of each of the two or more encryptable objects.

3. The encryption method of claim 1, wherein said computing of the representations comprises computing secure hashes of each of the two or more encryptable objects.

4. The encryption method of claim 1, wherein the two or more encryptable objects are identical.

5. One or more computer-readable media having computer-readable instructions thereon which, when executed by a computer, implement the method of claim 1.

6. A computer system programmed to implement the method of claim 1.

7. One or more computer-readable media having computer-readable instructions thereon which, when executed by a computer, cause the computer to:
   compute hashes of each of a plurality of identical objects;
   encrypt each of the identical objects with its hash;
   encrypt each hash with a different key; and
   form at least one ordered tuple each of which comprising:
      a single encrypted object that represents all of the identical objects; and
      a list that contains information about each of the different keys.

8. The computer-readable media of claim 7, wherein the list contains at least one identifier that uniquely identifies a key.

9. The computer-readable media of claim 7, wherein the list contains at least one encrypted hash.

10. The computer-readable media of claim 7, wherein the list contains a plurality of order pairs, each ordered pair containing:
   an identifier that identifies a key; and
   an encrypted hash that was encrypted with the key that is identified by the identifier.

11. The computer-readable media of claim 7, wherein the instructions cause the computer to:
   encrypt the hash with a one-way encryption function to provide an undecryptable encrypted hash; and
   form at least one ordered tuple to contain the undecryptable encrypted hash.

12. The computer-readable media of claim 11, wherein the instructions cause the computer to:
   form multiple ordered tuples; and
   determine whether objects that correspond to the multiple ordered tuples appear to be identical by comparing the single encrypted objects and the undecryptable encrypted hashes for each ordered tuple.

13. The computer-readable media of claim 7, wherein the identical objects comprise files.

14. A file system encryption method comprising:
   computing representations of two or more files;
   encrypting each of the files with its own representation, said encrypting defining a plurality of cipher objects each of which corresponds to a file;
   encrypting multiple representations with individual unique keys;
   ascertaining from the cipher objects whether the corresponding files are identical; and constructing a convergent cipher object that includes a cipher object that corresponds to identical files, each encrypted representation, and a key identifier for each key used to encrypt a multiple representation.

15. The file system encryption method of claim 14, wherein said computing of the representations comprises computing hashes of the two or more files.

16. The file system encryption method of claim 14, wherein said computing of the representations comprises computing secure hashes of the two or more files.

17. The file system encryption method of claim 14, wherein the two or more files are identical.

* * * * *